United States Patent
Hall et al.

(10) Patent No.: US 7,465,768 B2
(45) Date of Patent: Dec. 16, 2008

(54) METHOD TO REDUCE COUPLING DURING TERMINATION WITH FUNCTIONAL END-GROUPS

(75) Inventors: James E. Hall, Mogadore, OH (US); James Oziomek, Cuyahoga Falls, OH (US)

(73) Assignee: Bridgestone Corporation, Chuo-ku, Tokyo (JP)

( * ) Notice: Subject to any disclaimer, the term of this patent is extended or adjusted under 35 U.S.C. 154(b) by 268 days.

(21) Appl. No.: 11/137,602

(22) Filed: May 25, 2005

(65) Prior Publication Data

US 2005/0282967 A1    Dec. 22, 2005

(51) Int. Cl.
  *C08F 297/04*  (2006.01)
  *C08L 47/00*   (2006.01)

(52) U.S. Cl. ............... 525/285; 525/249; 525/250; 525/383; 525/386; 525/236

(58) Field of Classification Search ............ 525/383, 525/386, 285, 236, 249, 250, 283
See application file for complete search history.

(56) References Cited

U.S. PATENT DOCUMENTS

| | | | |
|---|---|---|---|
| 4,835,220 A * | 5/1989 | Bronstert et al. | 525/250 |
| 5,514,753 A | 5/1996 | Ozawa et al. | |
| 6,103,846 A | 8/2000 | Willis et al. | |
| 6,150,463 A * | 11/2000 | Lanza et al. | 525/98 |
| 6,242,538 B1 | 6/2001 | Bening et al. | |
| 6,391,981 B1 | 5/2002 | Willis et al. | |
| 6,492,469 B2 | 12/2002 | Willis et al. | |
| 7,009,000 B2 * | 3/2006 | Bening et al. | 525/98 |

* cited by examiner

*Primary Examiner*—Randy Gulakowski
*Assistant Examiner*—Olga Asinovsky
(74) *Attorney, Agent, or Firm*—Arthur M. Reginelli; Meredith E. Hooker

(57) ABSTRACT

A novel method of preparing carboxyl-terminated polymers. A monomer is mixed with an organolithium initiator in a hydrocarbon solvent so as to anionically polymerize linear living polymer lithium chains. A trialkyl aluminum compound is also mixed so as to form polymer lithium: aluminate complexes in equilibrium with the linear living polymer lithium chains. When a cyclic anhydride terminator is mixed, the cyclic anhydride terminator preferentially reacts with the C—Li center on a living polymer lithium chain rather than with the C—Al—Li center on a polymer lithium: aluminate complex.

24 Claims, 1 Drawing Sheet

METHOD TO REDUCE COUPLING DURING TERMINATION WITH FUNCTIONAL END-GROUPS

BACKGROUND OF THE INVENTION

1. Field of the Invention

The present invention relates to organolithium initiated anionic polymerizations of monomers in a hydrocarbon solvent terminated in the presence of metal alkyls. More particularly, the present invention relates to a method of synthesizing high molecular weight end-functional polymers by organolithium initiated anionic polymerizations terminated by carboxyl functional terminators.

2. Technical Background

Anionic polymerization of monomers in the presence of an anionic polymerization initiator is a widely used commercial process. When solution anionic techniques are used, polymers are prepared by contacting the anionically polymerizable monomers simultaneously or sequentially with an anionic polymerization initiator. Particularly effective anionic polymerization initiators are organolithium compounds having the general formula: $RLi_n$, wherein R is an aliphatic, cycloaliphatic, aromatic or alkyl-substituted aromatic hydrocarbon radical having from 1 to about 20 carbon atoms and n is an integer of 1 to 6.

Such lithium initiated anionic polymerization processes are frequently complicated by side reactions during the major portions of the process, including: side reactions during the growth of the lithium polymers; side reactions during the termination process; and side reactions after termination. Some of these side reactions cause coupling of living polymer chains. This is an impediment to the goal of making macrostructures with well defined molecular weights and high concentrations of functional end groups. Side reactions of interest can be classified as either readily reversible reactions, such as aggregations, or as generally irreversible reactions such as coupling or cross-linking. Prior art has identified and addressed some of these undesirable side reactions.

For example, prior art teaches anionically polymerizing at least one monomer in the presence of an organolithium initiator in a hydrocarbon solvent so as to produce a living polymer. The living polymer C—Li ends are then capped with a capping agent or with a terminating agent that produces a functional end group. Where a multifunctional organolithium initiator is used, strongly-associating chain ends are formed such that the polymer and solvent form a polymer gel.

It is known to prevent the formation of such polymer gel by the addition of a trialkyl aluminum compound or a similar alkali metal compound during the polymerization/capping process. In one process, a trialkyl aluminum compound is added to the polymer gel such that it dissipates the gel. In another process, the aluminum trialkyl may also be added before or during polymerization or before or with the capping agent.

In an example of another undesirable side reaction, the presence of C-alkali metal chain ends, and for example C—Li chain ends, in the living polymer during the polymerization contributes to the aggregation of polymer-alkali metal centers in a reversible side reaction that increases the viscosity of certain anionic polymerization solutions during the polymerization process. Where organolithium initiators are used, C—Li chain ends are the points in the molecule of the initiator where the carbon-lithium bond is located and at which the propagation of the polymer chain occurs. Certain lithium alkyls form aggregates in hydrocarbon solution. These aggregates are stabilized by metal-metal bonding between the lithium centers in the lithium alkyl moieties. When such aggregates are present in living anionic polymer solutions, the equilibrium between aggregated and unassociated polymer chains appears to strongly favor the aggregated species. The unassociated species, though present as a minor component of the mixture, is the only center for propagation of polymerization.

In solutions of living lithium polymers the aggregation of polymer-lithium centers can be described in the reversible side reaction:

$(Polymer-Li)_n \leftrightarrows n\ Polymer\text{-}Li.$

The aggregated moiety is n times larger in mass than the unassociated polymer, n representing the number of centers in the aggregate. For this reason, the viscosity of living anionic polymer cement (mostly aggregates) is typically higher than that of its terminated analog (as a terminated chain would have no C—Li centers, it has been generally assumed that a terminated chain will not be aggregated).

It is also known to reduce the aggregation of polymer-lithium centers by the addition of selected metal alkyls to solutions of living anionic polymers. The metal alkyl is selected from the group of metal alkyls that interact with C—Li centers to form metal "ate" complexes. The metal alkyl compounds are selected to be less basic and/or less bulky or both than the organo substituents of the alkali metal compound. The organo substituents of the alkali metal compound are aliphatic, cycloaliphatic, aromatic, or alkyl-substituted aromatic.

In one example of this type of interaction, an aluminum alkyl is used as an example of the preferred type of metal alkyl and a living anionic polymer chain end as the preferred type of aggregation prone lithium species. In solutions of living lithium polymers the formation of aluminate complexes can be described in the reversible side reaction:

$Polymer\text{-}Li + R_3Al \leftrightarrows Polymer\text{-}AlR_3Li.$

The "ate complex" is in equilibrium with the unassociated polymer chain. It is important that this complex is formed reversibly as the "ate complex" is not capable of either initiating or propagating the polymerization of monomer.

The equilibrium concentration of aggregated polymer-lithium species is reduced in preference to equilibrium formation of the aluminate complex. As more aluminum alkyl is added, more aggregated polymer-lithium species are eliminated, up to the limit where all of the polymer-lithium is associated with the aluminum center. This occurs at about one aluminum alkyl per polymer lithium center. Minimum effective amounts of metal alkyl are in the range of 0.01 equivalents of metal alkyl per 100 alkali metal centers. Generally, it is preferred that no more than 1.5 equivalents of metal alkyl be used, most preferably, no more than 1 equivalent. Whether the metal alkyl is added before or at the beginning of polymerization or during or after polymerization, the basis is equivalents of alkali metal.

SUMMARY OF THE INVENTION

The present invention is directed toward a method of making polymers, including the step of terminating a living polymer in the presence of at least one metal alkyl compound and a poly-functional poly-carbonyl terminator. The terminator has at least two reactive sites, each reactive site capable of reacting with a C—Li center on the living polymer so as to be capable to terminate the polymer.

DETAILED DESCRIPTION OF THE INVENTION

Figure 1:
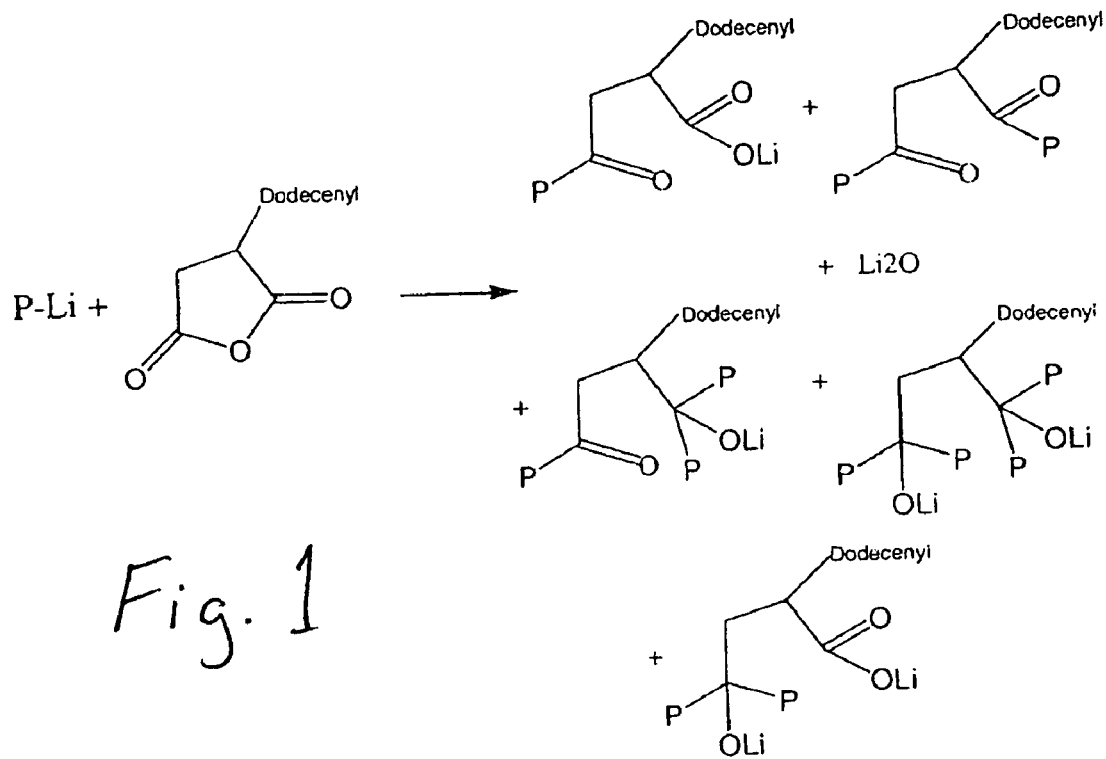
FIG. 1 shows the general chemical structural formulas of the reaction products from termination of linear living anionic polymer butadiene lithium chains (PBD-Li) with dodecenyl succinic anhydride (DDSA).

The present invention is directed toward a method of making polymers having functionalized carbonyl end groups. In a preferred embodiment, the products of the polymerization process are linear polymers having a "pom-pom" structure or a "pom" structure with carbonyl end groups. In another preferred embodiment, the products of the polymerization process also have a well defined molecular weight distribution. A well defined molecular weight distribution, as used herein, means a narrow, normal distribution of polymer molecular weights. In a more preferred embodiment, the products of the polymerization process are linear polymers having a "pom-pom" structure or a "pom" structure with carboxyl end groups and having a well defined molecular weight distribution.

The anionic polymerization process of this invention includes polymerizing one or more monomers with an organolithium initiator in a hydrocarbon solvent so as to produce a living polymer, and more particularly to produce a linear living polymer lithium chain. The living polymer lithium chain is functionalized and terminated by a poly-functional poly-carbonyl terminator in the presence of a metal alkyl compound. In one embodiment of the present invention the poly-functional poly-carbonyl terminator is a cyclic poly-functional poly-carbonyl terminator. In another embodiment, the terminator comprises a compound which includes more than two heteroatoms, e.g., but not limited to, O, S, or N. In a preferred embodiment a cyclic anhydride terminator is used as a terminator. In more preferred embodiments, succinic anhydride or an alkyl derivative of succinic anhydride, such as dodecenyl succinic anhydride, are used as a suitable cyclic poly-functional poly-carbonyl terminator.

The poly-functional poly-carbonyl terminator has at least two reactive sites wherein each reactive site is capable of reacting with the C—Li center on a living polymer lithium chain so as to terminate the polymer lithium chain. When a reaction with one site terminates a first living polymer lithium chain, another reactive site retains the chemical potential to terminate a second living polymer lithium chain so that the second polymer chain would be coupled with the first polymer chain.

As used herein, the term "coupling" refers to the linking and termination of multiple living polymer lithium chains to a single terminator through generally non-reversible reactions. Coupling reactions in the polymerization process result in linear and non-linear polymer chains having an interior terminator group. Linking of multiple living polymer lithium chains and multiple terminators into a polymer network is also contemplated by use of the term "coupling". Excluded from this use of the term "coupling" are generally reversible non-pair bonding associations such as may be found in aggregations.

These coupling reactions are a previously unresolved class of undesirable side reactions occurring during termination of living polymers with a poly-functional poly-carbonyl terminator. These coupling reactions have two undesired effects. The coupling reactions increase the molecular weight of the polymerization product, distorting the desired distribution of molecular weights. Additionally, the coupling reactions decrease the amount of functional end groups produced during termination. The terminator compounds of coupled polymer lithium chains are not in an end group position in the overall polymer chain and their functionality may be changed by terminating living polymer lithium chains at multiple functional sites of the terminator compounds.

The inventors have discovered that the tendency to undergo such secondary coupling of a terminated first living polymer lithium chain and a second living polymer lithium chain is significantly reduced when termination is conducted in the presence of the metal alkyl compound. When termination is conducted in the absence of the metal alkyl, extensive coupling takes place. By reducing the amount of coupling during termination, a greater amount of the terminated polymer chains have functional end-groups. Correspondingly, a lower amount of the terminated polymer chains have interior terminator functional groups. In embodiments of the invention where the living polymer lithium chains have well defined molecular weight distributions, conducting termination in the presence of the metal alkyl compound reduces the distortion of the molecular weight distributions caused by coupling. In embodiments of the invention where the living polymer lithium chains are linear mono-lithium living polymer lithium chains, conducting termination in the presence of the metal alkyl compound reduces the amount of non-linear polymers produced by coupling. In embodiments of the invention where the living polymer lithium chains include di-lithium living polymer lithium chains, conducting termination in the presence of the metal alkyl compound reduces the crosslink density at various initial monomer concentrations.

One embodiment of the invention of particular interest is a method of making linear polymers having functional carboxyl end-groups. In this process, a monomer is mixed with an organolithium initiator in a hydrocarbon solvent so as to anionically polymerize linear living polymer lithium chains. In one preferred embodiment a conjugated diene monomer is included in the anionic monomers polymerized in a non-polar hydrocarbon solvent to make linear conjugated diene polymers terminated with carboxyl end-groups. In a more preferred embodiment, the conjugated diene monomer is butadiene polymerized in a hexane solvent.

A trialkyl aluminum compound is also mixed so as to form polymer lithium : aluminate complexes in equilibrium with the linear living polymer lithium chains. A suitable cyclic anhydride is mixed and terminates the linear living polymer lithium chains in the presence of the trialkyl aluminum compound so as to form linear polymers having functional carboxyl end-groups. Suitable cyclic anhydrides include succinic anhydride and alkyl derivatives of succinic anhydride. In one preferred embodiment, dodecenyl succinic anhydride is the selected terminator.

Termination conducted in the presence of the trialkyl aluminum compound significantly reduces secondary coupling of a terminated first living polymer lithium chain and a second living polymer lithium chain. When termination is conducted in the absence of the trialkyl aluminum compound, extensive coupling takes place. By reducing the amount of coupling during termination, a greater amount of the terminated polymer chains have functional carboxyl end-groups. Without being bound by theory, it is thought that the cyclic anhydride terminator preferentially reacts with the C—Li center on living polymer lithium chains rather than with the C—Al—Li center on a polymer lithium : aluminate complexes.

Suitable trialkyl aluminum compounds have been found to have from 1 to 10 carbon atoms per alkyl organo substituent. Such trialkyl aluminum compounds include: trimethylaluminum, triethylaluminum, tri-n-propylaluminum, tri-n-butylaluminum, triisobutylaluminum, tri-n-hexylaluminum, and trioctylaluminum. In one preferred embodiment trimethylaluminum is used as the trialkyl aluminum compound.

In one embodiment of the invention, between about 0.10 to about 1.5 equivalents, preferentially between about 0.5 to about 1.5 equivalents, and more preferentially about 1.0 equivalents of the metal alkyl compound per equivalent of the organolithium initiator are mixed in during polymerization.

EXAMPLES

One embodiment of this invention is directed toward synthesis of linear polymer 1,3 butadiene (PBD) having a "pom-pom" structure or a "pom" structure with carboxyl end-groups formed by termination of linear living anionic polymer butadiene lithium chains (PBD-Li) with a terminator package consisting only of dodecenyl succinic anhydride (DDSA). Without modification of the termination process, significant coupling occurs. FIG. 1 shows the reaction products from termination of linear living anionic polymer lithium chains (PBD-Li) with dodecenyl succinic anhydride (DDSA). Besides the desired polymer terminated in a carboxyl "pom" end-group, the overall termination reaction produces various structures each having multiple PBD-Li chain terminations. Experimental results indicate that the cumulative coupling of the PBD-Li chains is 71% with a near doubling of the molecular weight of the mono-lithium living polymer lithium chain derived polymers and with a four to five multiple increase in the molecular weight of the di-lithium living polymer lithium chain derived polymers. In one experimental run adding between two and five time excess of the DDSA terminator showed little or no effect in reducing the undesired coupling reactions.

Figure 2:
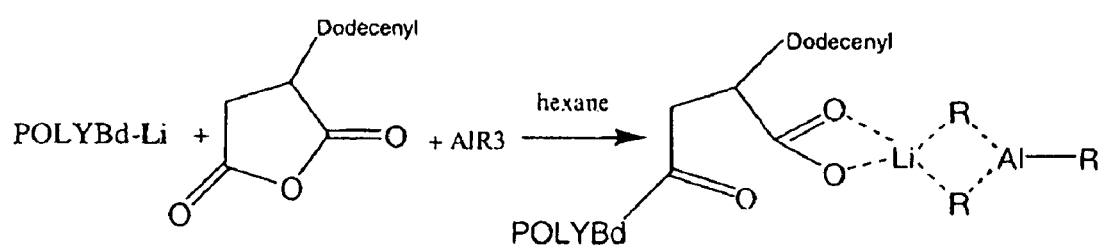
FIG. 2 shows the general chemical structural formula of the reversible reaction of PBD-Li, DDSA and TAA forming PBD-Li: Aluminate complex.

Two experiments were run using trialkyl aluminum (TAA) before the addition of the DDSA to demonstrate how the amount of coupling could be reduced by terminating the linear living anionic PBD-Li chains in the presence of a trialkyl aluminum compound. FIG. 2 shows the formula for the reversible reaction of PBD-Li, DDSA and TAA forming the PBD-Li : Aluminate complex thought to aid in reducing coupling as described generally above.

In one experiment, triisobutylaluminum (TIBA) was added to a hexane solution having PBD-Li polymers of about 32,000 Mn before reacting with DDSA. As seen in Table 1 below, size exclusion chromatography data from this small experiment suggest that coupling has been reduced from about 71% with no TIBA added to about 14% at a ratio of 1 equivalent amount of Al to 1 equivalent amount of polymer Li (Al/PLi). When the data is graphed, the reduction in coupling appears to be linear with the addition of TIBA. Similar linear relationships between the reduction of coupling and the addition of similar TAAs is suggested.

TABLE 1

Effect of TIBA on Coupling Reactions of DDSA

| | Run | | | |
|---|---|---|---|---|
| | 1 | 2 | 3 | 4 |
| Al/Li | 1.01 | 0 | 0.4 | 0.61 |
| DDSA/Li | 3.18 | 3.18 | 3.18 | 3.18 |
| DDSA/(Li + Al) | 1.57 | 3.18 | 2.27 | 1.98 |

TABLE 1-continued

Effect of TIBA on Coupling Reactions of DDSA

| | Run | | | |
|---|---|---|---|---|
| | 1 | 2 | 3 | 4 |
| % Coupled PBD | 13.9 | 71 | 46.3 | 33.2 |
| Mn | 31500 | 41000 | 40700 | 37000 |

In another experiment, another TAA, trimethylaluminum (TMA), was added to a hexane solution having PBD-Li polymers of about 12,000 Mn before reacting with DDSA. As shown in Table 2, coupling was reduced from about 71% with no TIBA added to about 14% at a ratio of 1 equivalent amount of Al to 1 equivalent amount of polymer Li (Al/PLi). In this experiment the Al/PLi ratio was extended beyond 1. When the data is graphed, the reduction in coupling appears to be linear with the addition of TMA only until the Al/PLi ratio reaches 1 and then an increase in coupling is seen with the use of additional amounts of TMA. It is apparent that a separate coupling reaction is caused by the presence of the TMA and prevents the coupling from being reduced to 0%.

TABLE 2

Effect of TMA on Coupling Reactions of DDSA

| | Run | | | | | |
|---|---|---|---|---|---|---|
| | 1 | 2 | 3 | 4 | 5 | 6 |
| Al/PLi | 0 | 0.33 | 0.67 | 1 | 1.33 | 1.67 |
| % Coupled PBD | 78.8 | 57.4 | 37.6 | 14.3 | 20.2 | 24 |

Thus, according to the method of the present invention, the amount of the trialkyl aluminum compound per equivalent amount of the organolithium initiator can be selected such that the amount of terminated polymer lithium chains that are coupled is less than about 50 percent and preferentially between about 10 percent and about 40 percent. The experiments indicate that trialkyl aluminum compound per equivalent amount of the organolithium initiator can be selected such that the amount of terminated polymer lithium chains that are coupled is minimized. Generally, minimum coupling occurs at an Al/PLi ratio of about 1.

In one embodiment of the invention, between about 0.10 to about 1.5 equivalents, preferentially between about 0.5 to about 1.5 equivalents, and more preferentially about 1.0 equivalents of the trialkyl aluminum compound per equivalent of the organolithium initiator are mixed in during polymerization.

One skilled in the art would recognize that the method of this invention can be applied to living polymer chains varying in molecular weight from about 4,000 and above. The method can also be used in polymerization of block or random copolymers having conjugated dienes and vinyl aromatic monomers and in the synthesis of thermoplastic elastomeric block copolymers terminated with carboxyl end-groups such as carboxylates, ketones, hydroxyls, esters and lactones.

One skilled in the art would recognize that this method would also be useful in achieving end-group carboxylations using $CO_2$ to produce polymers with well defined molecular weights. One skilled in the art would also recognize that this method would also be useful in achieving end-group functionalization with tetraethoxysilane with minimal reduction in the amount of functional end-groups.

The invention has been described with reference to the preferred embodiments. Modifications and alterations will occur to others upon reading and understanding the specification. The invention is intended to include such modifications and alterations insofar as they come within the scope of the disclosure and claims.

What is claimed is:

1. A method of making polymer comprising terminating a living polymer with a cyclic anhydride, wherein said step of terminating is conducted in the presence of at least one metal alkyl compound.

2. The method of claim 1 wherein the living polymer comprises 1,3-butadiene.

3. The method of claim 1, wherein the metal alkyl compound comprises a trialkyl aluminum compound.

4. The method of claim 3, wherein the trialkyl aluminum compound comprises a compound selected from the group consisting of trimethylaluminum, triethylaluminum, tri-n-propylaluminum, tri-n-butylaluminum, triisobutylaluminum, tri-n-hexylaluminum, and trioctylaluminum.

5. The method of claim 1, wherein the metal alkyl compound comprises trimethylaluminum.

6. The method of claim 1, wherein the living polymer comprises a mono-lithium living polymer chain.

7. The method of claim 1, wherein the living polymer comprises a di-lithium living polymer chain.

8. The method of claim 1, wherein the metal alkyl compound is selected from the group consisting of trialkyl aluminum compounds comprising from 1 to 10 carbon atoms per alkyl organo substituent.

9. The method of claim 1, wherein an amount of the metal alkyl compound comprises from about 0.10 to about 1.5 equivalents per equivalent of an organolithium initiator.

10. The method of claim 1, wherein an amount of the metal alkyl compound comprises from about 0.5 to about 1.5 equivalents per equivalent of an organolithium initiator.

11. The method of claim 1, wherein an amount of the metal alkyl compound comprises about 1.0 equivalent per equivalent of an organolithium initiator.

12. The method of claim 1, wherein the cyclic anhydride comprises succinic anhydride or an alkyl derivative of succinic anhydride.

13. The method of claim 12, wherein the cyclic anhydride comprises dodecenyl succinic anhydride.

14. A method of making linear polymers comprising functional carboxyl end-groups, the method comprising the steps of:
(a) polymerizing a monomer in the presence of an organolithium initiator in a hydrocarbon solvent thereby forming a solution of linear living polymer lithium chains;
(b) adding a trialkyl aluminum compound to said solution after said step of polymerizing thereby forming polymer lithium: aluminate complexes in equilibrium with the linear living polymer lithium chains; and
(c) adding a cyclic anhydride terminator to said solution after adding said trialkyl aluminum compound.

15. A method of making linear conjugated diene polymers terminated with carboxyl end-groups, the method comprising:
(a) polymerizing at least one anionic monomer in the presence of an organolithium initiator in a non-polar hydrocarbon solvent thereby forming linear living anionic polymer lithium chains in solution, said at least one anionic monomer comprising a conjugated diene monomer;
(b) adding a trialkyl aluminum compound to said solution after said step of polymerizing; and
(c) adding a cyclic anhydride terminator to said solution after adding said trialkyl aluminum compound, whereby the linear living anionic polymer lithium chains in the presence of the trialkyl aluminum compound form linear conjugated diene polymers terminated with carboxyl end-groups,
wherein the cyclic anhydride comprises succinic anhydride or an alkyl derivative of succinic anhydride, and
further wherein the trialkyl aluminum compound is selected from the group consisting of trialkyl aluminum compounds comprising from 1 to 10 carbon atoms per alkyl substituent.

16. The method of claim 15, wherein the linear conjugated diene polymers terminated with carboxyl end-groups further comprises thermoplastic elastomeric block copolymers.

17. The method of claim 14, where said step of adding said cyclic anhydride couples two or more of said linear living polymer lithium chains.

18. The method of claim 17, wherein the amount of the trialkyl aluminum compound added in said step of adding a trialkyl aluminum compound is an amount sufficient to limit the amount of coupling to less than about 50 percent.

19. The method of claim 18, wherein the amount of the trialkyl aluminum compound added in said step of adding a trialkyl aluminum compound is an amount sufficient to limit the amount of coupling to between about 40 percent and about 10 percent.

20. The method of claim 18, wherein the amount of the trialkyl aluminum compound added in said step of adding a trialkyl aluminum compound is an amount sufficient to limit the amount of coupling to less than about 20 percent.

21. The method of claim 17, where the amount of cyclic trialkyl aluminum compound added in said step of adding trialkyl aluminum compound is from about 0.1 to 1.5 moles of trialkyl aluminum compound per 1 mole of organolithium initiator.

22. A method of making linear polymers comprising functional carboxyl end-groups, the method comprising the steps of:
(a) polymerizing a monomer in the presence of an organolithium initiator in a hydrocarbon solvent thereby forming a solution of linear living polymer lithium chains;
(b) adding a trialkyl aluminum compound to said solution after said step of polymerizing thereby forming polymer lithium: aluminate complexes in equilibrium with the linear living polymer lithium chains; and
(c) adding a cyclic anhydride terminator to said solution after adding said trialkyl aluminum compound;
wherein said step of adding said cyclic anhydride couples less than about 50 percent of said linear living polymer lithium chains.

23. The method of claim 22, wherein said step of adding said cyclic anhydride couples between about 40 percent and 10 percent of said linear living polymer lithium chains.

24. The method of claim 22, wherein said step of adding said cyclic anhydride couples less than about 37.6 percent of said linear living polymer lithium chains.

* * * * *